United States Patent [19]

Hirohata et al.

[11] 4,348,092

[45] Sep. 7, 1982

[54] ELECTROMAGNETICALLY DRIVEN SHUTTER

[75] Inventors: Michio Hirohata, Inagi; Nobuo Tezuka, Tokyo, both of Japan

[73] Assignee: Canon Kabushiki Kaisha, Tokyo, Japan

[21] Appl. No.: 232,851

[22] Filed: Feb. 9, 1981

[30] Foreign Application Priority Data

| Feb. 8, 1980 [JP] | Japan | 55-15089 |
| Feb. 8, 1980 [JP] | Japan | 55-15091 |
| Feb. 8, 1980 [JP] | Japan | 55-15415[U] |
| Feb. 8, 1980 [JP] | Japan | 55-15416[U] |
| Feb. 8, 1980 [JP] | Japan | 55-15417[U] |
| Feb. 8, 1980 [JP] | Japan | 55-15418[U] |

[51] Int. Cl.³ .............................................. G03B 9/22
[52] U.S. Cl. .................... 354/230; 354/234; 354/264
[58] Field of Search ............... 354/26 BO, 36, 38, 42, 354/49, 59, 230, 234, 235, 271, 258, 256, 226, 250, 252, 261, 263, 264; 355/71; 350/269, 272, 273; 250/229; 310/27, 36–39; 336/225, 232; 335/224, 225, 219

[56] References Cited

U.S. PATENT DOCUMENTS

| 2,969,007 | 1/1961 | Groger | 354/230 |
| 4,167,313 | 9/1979 | Tsonefuji | 354/38 X |
| 4,176,929 | 12/1979 | Ito et al. | 354/29 |

Primary Examiner—L. T. Hix
Assistant Examiner—William B. Perkey
Attorney, Agent, or Firm—Toren, McGeady & Stanger

[57] ABSTRACT

In an electromagnetically driven shutter with a rotor having a conductive coil pattern and a stator with permanent magnets arranged thereon to form a magnetic field in which the rotor is driven to rotate, the rotor is provided with a return spring urging the shutter blades in a closing direction while nevertheless preventing bouncing of the rotor resulting from operation of the return spring when the shutter blades are fully opened.

6 Claims, 11 Drawing Figures

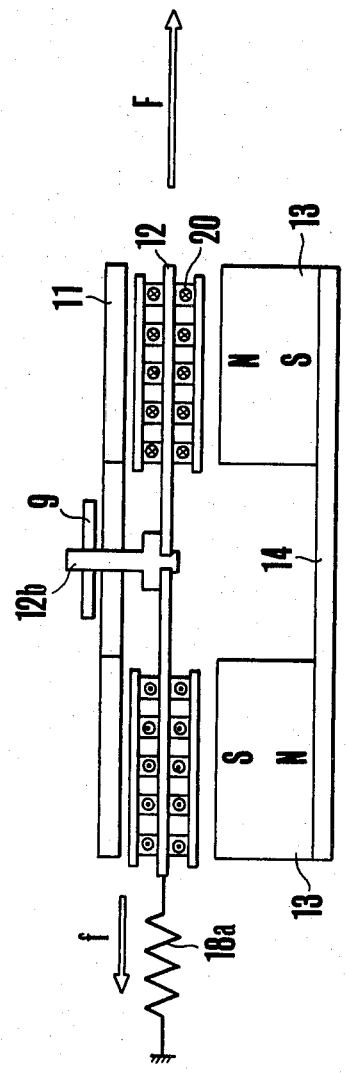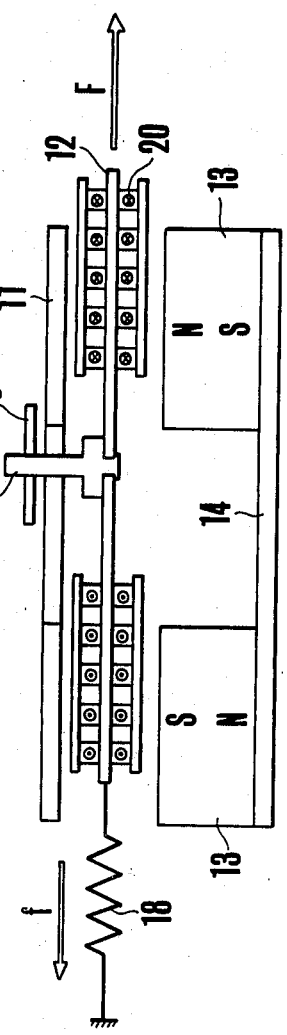

ELECTROMAGNETICALLY DRIVEN SHUTTER

BACKGROUND OF THE INVENTION

1. Field of the Invention

This invention relates to moving coil type electromagnetically driven shutters and more particularly to the prevention of bouncing of the shutter blade drive rotor.

2. Description of the Prior Art

In general, the moving coil type electromagnetically driven shutters open the shutter blades by applying an electromagnetic force to the drive rotor for the shutter blades. During a long exposure, the application of the electromagnetic force continues in the exposure aperture fully open position. Then, when the shutter blades are closed, the electromagnetic force is no longer applied to allow for the reaction of the return spring.

As the shutter blades approach the fully open position, the reaction force of the retrun spring is increased. It is therefore required that the electromagnetic drive force for opening the shutter blades be of magnitude above what is necessary. The use of such excessive electromagnetic force in driving the rotor produces a disadvantage in that when the rotor is stopped by a stopper at the position where the shutter blades are fully open, the rotor is apt to bounce. Thus, when the rotor arrives at the stopper, a shock is produced which impels the shutter blades to move in the closing down direction. As the reverse drive force is balanced with the electromagnetic force, the shutter blades move forward again. Such a procedure repeats itself in a very short period of time against the stopper. Assuming that a shutter closing signal appears at a time during bouncing of the shutter blades, then the net exposure time is erroneously elongated or shortened depending upon the bouncing position of the shutter blades. That is, in case the deactuating signal occurs when the shutter drive rotor is bouncing in a direction to open the shutter blades, the time lag from the moment at which the shutter deactuating signal has appeared to the moment at which the shutter starts to close is relatively long. On the other hand, when the bouncing of the rotor in a direction to close the shutter blade coincides with the appearance of the deactuating signal, the above defined time lag is relatively short. Thus, the occurrence of the bouncing of the rotor at the start of closing of the shutter blades leads to deviation of the exposure value by a considerable amount.

Aside from this drawback, it is desirable to make the shutter drive rotor as light in weight as possible. Therefore synthetic resin has found use as the material of the rotor. As the shutter drive rotor is struck against the stopper repeatedly in one cycle of shutter operation, it is however found that the strength of the rotor is insufficient in the active area thereof for contact with the stopper. After a small number of cycles of shutter operation, it will be seen that the rotor is deformed or cracked.

SUMMARY OF THE INVENTION

A first object of the present invention is to eliminate the above-described drawbacks and to prevent the bouncing of the shutter blade drive rotor by arranging a coil pattern on the rotor so that that part of the coil pattern which takes its place in the magnetic field of the permanent magnet gets longer and longer in total length when in the early stage of opening of the shutter blades and then becomes shorter and shorter as the shutter blades approach the fully open position.

A second object of the invention is to provide the shutter blades which also serve as the diaphragm blades with an auxiliary diaphragm aperture for light metering arranged so that when the exposure aperture defined by the shutter blades nears the maximum size, the size of the auxiliary aperture is stopped down thereby the possibility of the occurrence of a deactuating signal for the shutter during bouncing of the shutter drive rotor is reduced to a minimum.

A third object of the invention is to provide means for finely adjusting the timing of the start of opening of the auxiliary diaphragm aperture with respect to that of the opening of the exposure aperture.

A fourth object of the present invention is to provide an electromagnetically driven shutter with the drive rotor reinforced by the same metal as that of the above-described coil pattern as it is left unetched.

A fifth object of the present invention is to provide means for finely adjusting the standstill position of the shutter drive rotor.

BRIEF DESCRIPTION OF THE DRAWINGS

FIG. 5 is a similar view in an intermediate point on the way from FIG. 2 to FIG. 3.

FIG. 6 is a similar view in the position of FIG. 3.

DESCRIPTION OF THE PREFERRED EMBODIMENTS

Figure 1:
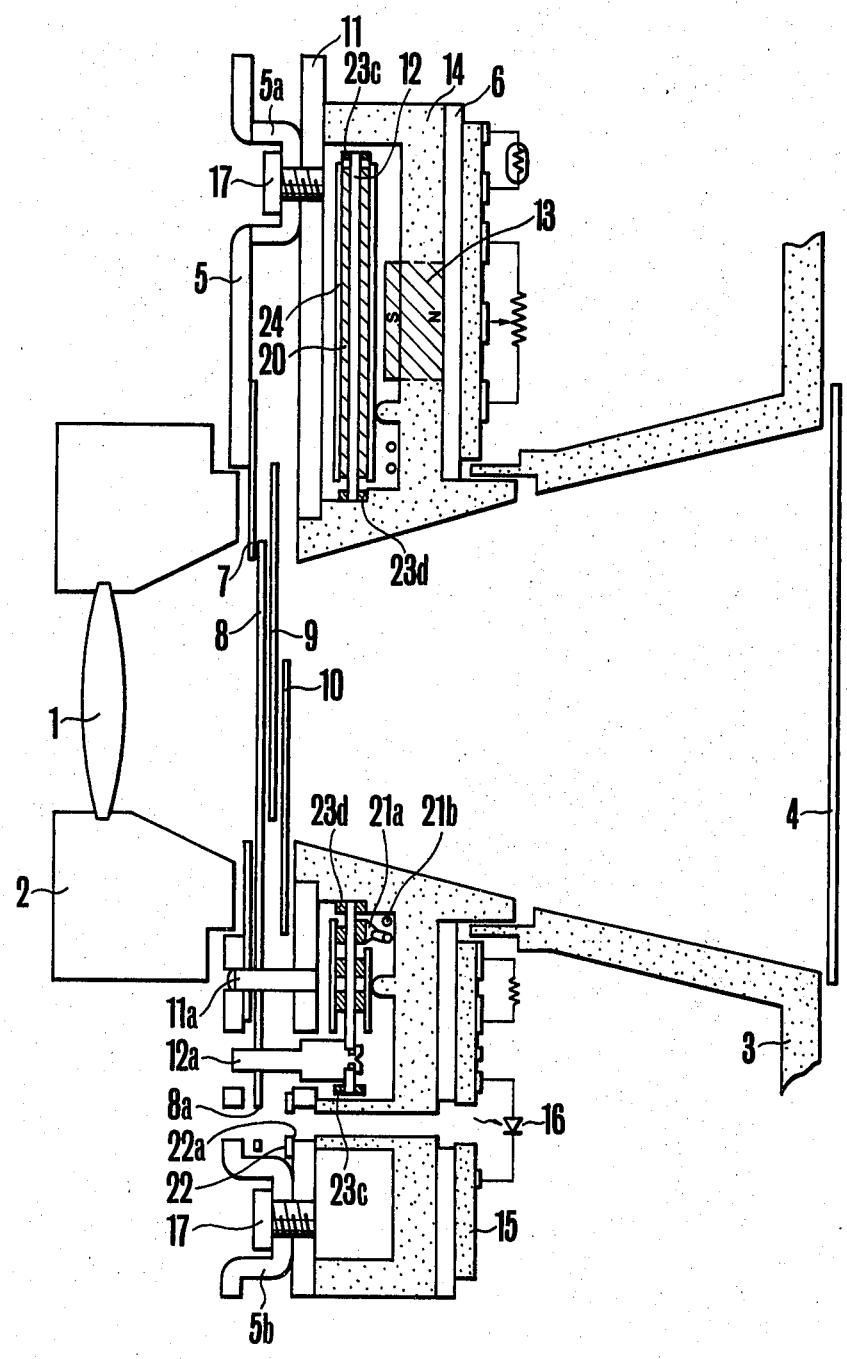
FIG. 1 is a sectional view of one embodiment of an electromagnetically driven shutter according to the present invention.

FIG. 1 shows the main parts of an electromagnetically driven shutter of the present invention. 1 is a photo-taking lens; 2 is a holder for the lens 1; 3 is a black box; and 4 is a photographic film. Positioned between the lens holder 2 and the black box 3 is an electromagnetically driven shutter unit. This electromagnetically driven shutter unit has a first base plate 5 and a second base plate 6 of magnetic substance, between which there intervene a shutter opening range limiting member 7, three shutter blades 8, 9 and 10 of synthetic resin, a guide plate 11 of magnetic material, a rotor 12 and a position determining plate 14 with permanent magnets 13. Arranged on the back face of the base plate 6 is a substrate having printed thereon a circuit. The first base plate 5, limiting member 7, and position determining member 14 are each provided with an apertured portion for passage therethrough of light from the lens 1. In order to block and unblock this optical path there are provided the shutter blades 8, 9 and 10. The position determining member 14 of synthetic resin has a shaft bearing portion at which the guide plate 11 and rotor 12 are settled. Also the first base plate 5, guide plate 11, position determining member 14 and printed substrate 15 are each provided with an auxiliary aperture for measurement of object brightness by a photo-sensitive element 16. The size of the auxiliary aperture is defined by the shutter blade 8 and an auxiliary diaphragm blade 22. The first base plate 5 and the guide plate 11 are connected to each other by screw fasteners 17. The shutter blades 8, 9 and 10 are arranged along with the limiting member 7 in a space between the first base plate 5 and the guide plate 11, with flanged portions 5a and 5b of the first base plate 5 establishing the space. Pivot pins 11a, 11b and 11c for the shutter blades 8, 9 and 10 respectively are located around the shaft bearing portion of the guide plate 11 and penetrate the shutter blades 8, 9 and 10 and the limiting member 7, extending into respective fitted holes in the first base plate 5. The guide plate 11 is provided with guide holes which pins 12a, 12b and 12c on the rotor 12 penetrate respectively, these pins 12a, 12b and 12c functioning as drive shafts of the shutter blades 8, 9 and 10. The position determining member 14 carries four pairs of rare earth permanent magnet pieces 13 of different polarity magnetized in the thickness direction. These permanent magnet pieces 13 constitute a magnetic circuit together with the second base plate 6 and the guide plate 11 and form respective magnetic fields 25 indicated by hatched lines in FIGS. 2 and 3.

Figure 2:
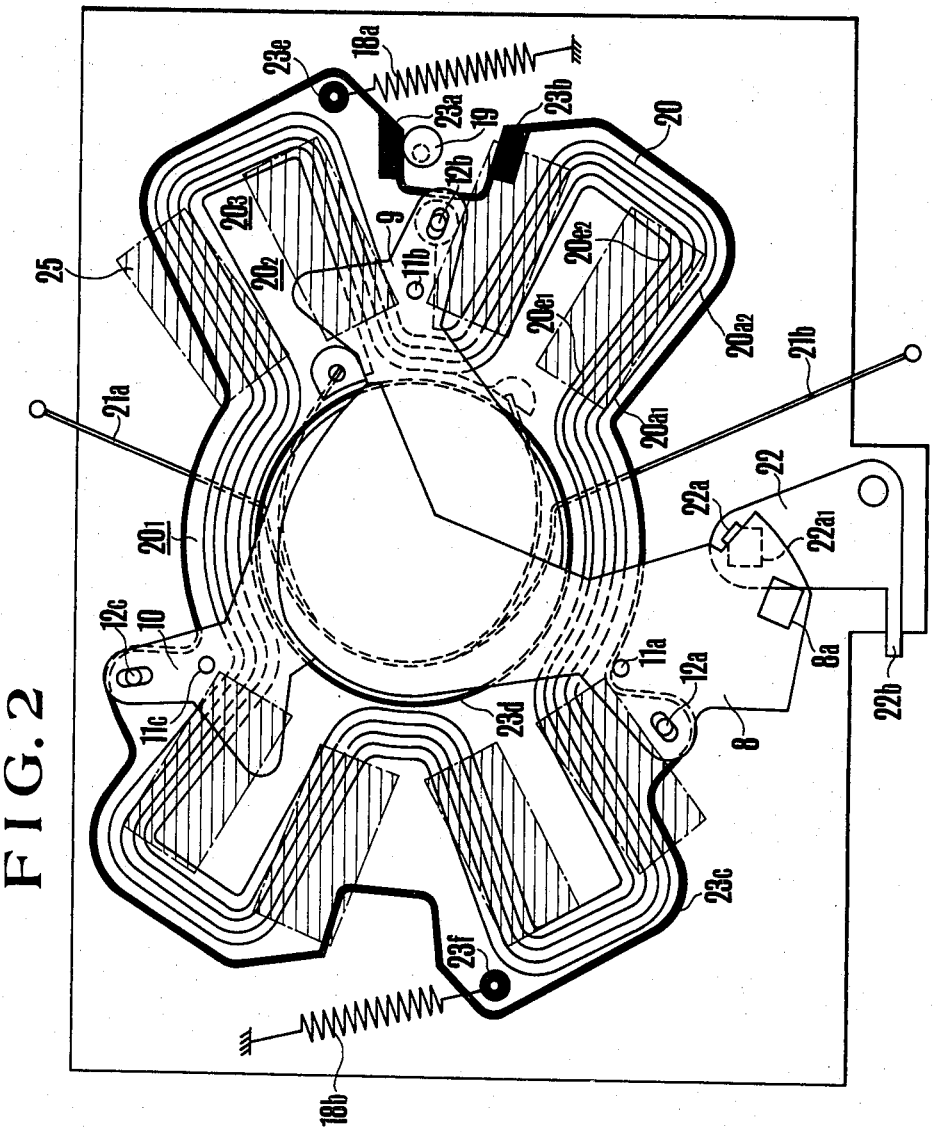
FIG. 2 is an elevational view of the shutter drive rotor of FIG. 1 in the standstill position.

FIG. 2 shows the practical form of the rotor 12 and shutter blades 8, 9 and 10 with the exclusion of the guide plate 11 for the purpose of clarity.

Figure 3:
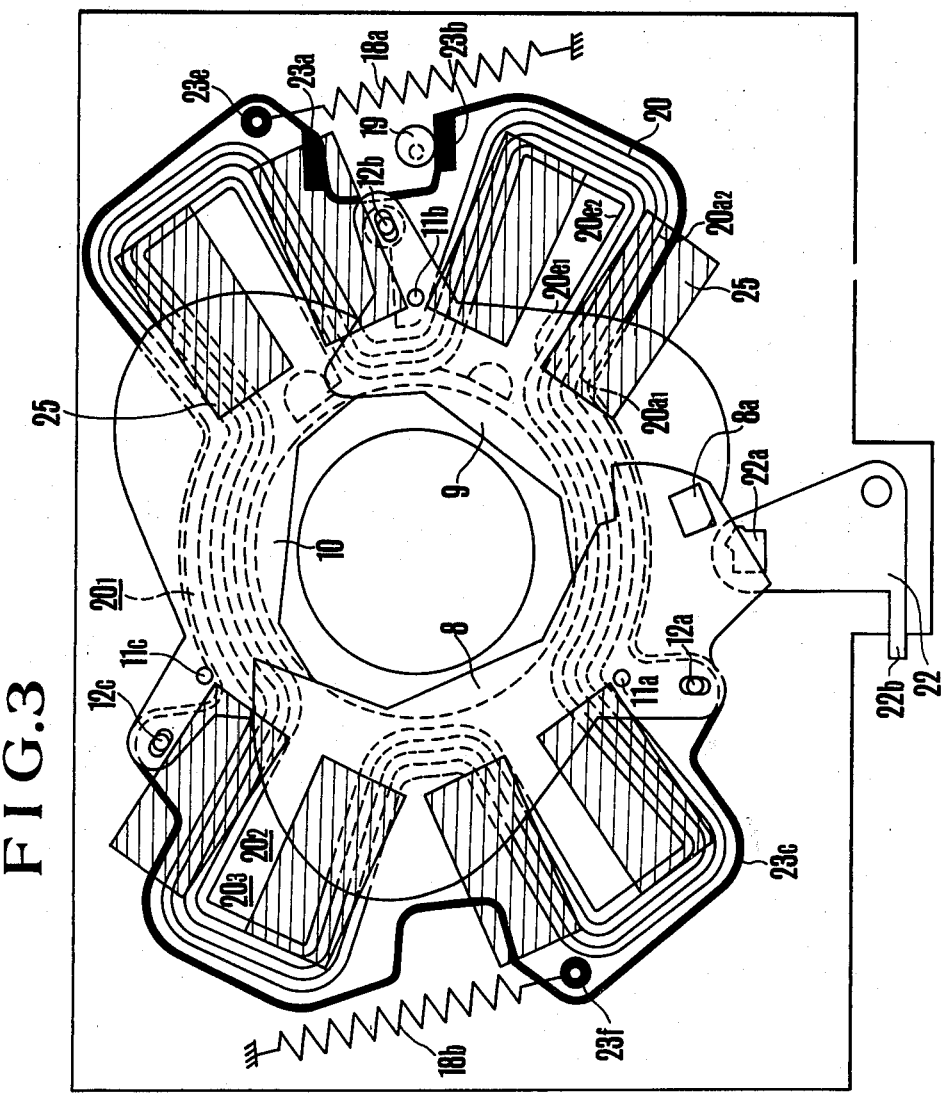
FIG. 3 is a similar view showing the rotor in the aperture fully open position.
Figure 4:
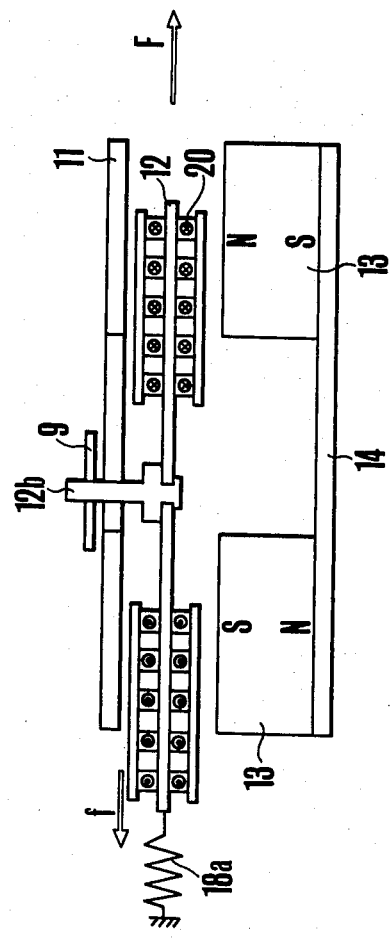
FIG. 4 is a schematic side view showing the positional relationship of the coil with the permanent magnet pieces in the position of FIG. 2.

The rotor 12 is urged in a clockwise direction by springs 18a and 18b and is at a standstill in abutting engagement on a stopper 19. This stopper 19 is made eccentric upon rotation to finely adjust the standstill position of the rotor 12. Both surfaces of the rotor 12 have patterns of coil 20 in the printed form which are electrically connected to each other by one of the drive pins, 12b. Both ends of the coil 20 terminate at points in the vicinity of the inner diameter of the rotor 12, with which there are connected respective single-core copper lead wires 21a and 21b behind the inner surface of the rotor 12. These lead wires 21a and 21b form slack loops in a space between the shaft bearing portion of the position determining member 14 and the permanent magnet pieces 13 and are taken out from the gap between the two of permanent magnet pieces 13 to connect with a drive circuit (not shown). These lead wires 21a and 21b are insulated from the second base plate 6 by the synthetic resin member 14. Since the above-described drive pin 12b has a potential, the shutter blades 8, 9 and 10 are made up of non-metal or other suitable insulating material such as polyester sheets dyed black. Formed in the shutter blade 8 is a window 8a which constitutes an auxiliary diaphragm together with a mask portion 22a of an auxiliary diaphragm blade 22. This auxiliary diaphragm blade 22 is movable through an arm 22b to vary the position of the mask portion 22a. The rotor 12 is made up of synthetic resin such as glass-epoxy. That part of the rotor 12 which acts on the stopper 19 is provided with a metal layer of the same kind as that of the coil 20. This metal layer in the portions 23a and 23b reinforces the rotor 12 so that the production of cracks by the shock resulting from striking with the stopper 19 is prevented. Also along the outer and inner peripheries of the rotor 12 there are bands of the same metal indicated at 23c and 23d. The outer metal portion 23c functions to prevent the production of cracks, and the inner metal portion 23d to prevent damage resulting from thermal expansion as the ambient temperature varies. Thus, rotation of the rotor 12 relative to the position determining member 14 is smoothly performed. Also the portions at which the springs 18a and 18b are connected are reinforced as indicated at 23e and 23f. And, the coil 20 on the rotor 12 is covered by a member 24 to prevent electrical contact of the coil 20 with the guide plate 11. The above-described permanent magnet pieces 13 are configured to a rectangular shape in cross section, there are eight in number constituting four pairs, and they are radially oriented and arranged on the position determining member 14. Formed by these permanent magnet pieces 13 are rectangular magnetic fields 25 respectively as shown in FIGS. 2 and 3. The above-described coil 20 is constructed in the form of a pattern shown as having five tracks in equally spaced relation each consisting of interior portions $20_1$, radial portions $20_2$ and exterior portions $20_3$. Every adjacent two of the radial portions $20_2$ with their intervening or exterior portion $20_3$ are conformed to a sector shape, and all the sectors are so arranged that the number of radial tracks travelling through the magnetic field 25 is increased and then decreased as the rotor 12 rotates.

The operation of the electromagnetically driven shutter of such construction will be described below by reference to FIGS. 3 to 7. When the coil 20 on the rotor 12 is supplied with current through the lead wires 21a and 21b from a circuit (not shown), the current interacts with the magnetic flux of the permanent magnet 13 so that an electromagnetic force F is exerted on the rotor 12 according to Fleming's left hand law as indicated by the arrow in FIG. 4. Since, at this time, a spring force f is applied on the rotor 12 by the springs 18a and 18b, as the electromagnetic force F is stronger than the spring force f, the rotor 12 starts to rotate in a counter-clockwise direction as viewed in FIGS. 2 and 3. As this rotation advances, the line elements $20a_1$–$20a_2$ of the coil 20 gradually enter the magnetic field 25, beginning with the line element $20a_1$, while diagonally traversing the magnetic field 25, whereby the electromagnetic force F is increased gradually. When the coil 20 reaches the position of FIG. 5, all the line elements lie in the magnetic field, allowing the electromagnetic force F to reach a maximum value. Then, as the rotor 12 rotates from the position of FIG. 5 to the position of FIGS. 3 and 6, the line elements of the coil, $20e_1$–$20e_2$ gradually exit from the magnetic field 25 beginning with the line element $20e_2$, whereby the electromagnetic force F is gradually decreased. Then, further rotation of the rotor 12 is stopped by the stopper 19 and the shutter is fully opened as shown in FIG. 3. In this position, the electromagnetic force F is slightly stronger than the force of the return springs 18 so that the shutter is retained in the exposure aperture fully open position.

On the other hand, the output of the photo-sensitive element 16 is processed to derive an exposure value by a computer circuit (not shown). At the termination of duration of a time interval depending upon the output of this computer circuit, the current supply to the coil 20 is cut off and the electromagnetic force F is caused to disappear. Then the rotor 20 is driven by the force f of the return spring 18 to rotate in a clockwise direction, while closing down the shutter blades.

Figure 7:
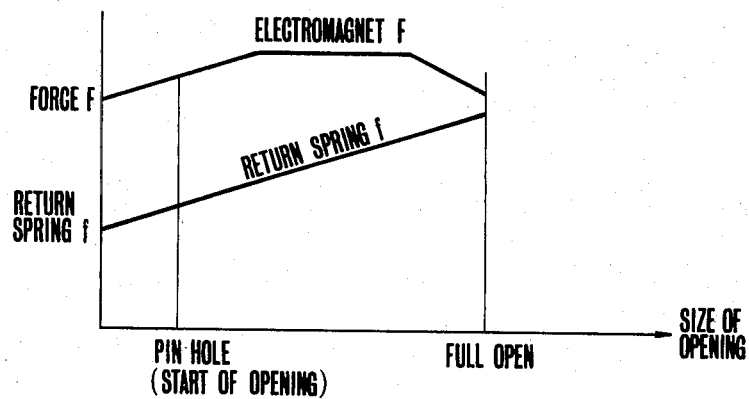
FIG. 7 is a graph schematically showing the variations of the electromagnetic force F and the return spring force f with the size of the aperture opening in the shutter of FIGS. 1 to 3.
Figure 8:
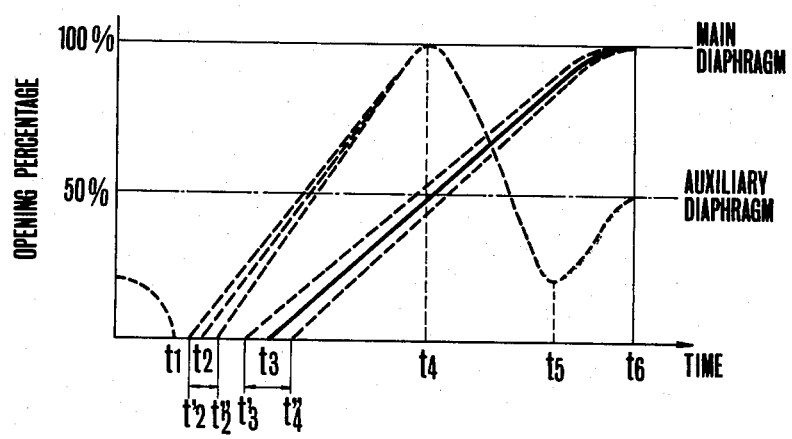
FIG. 8 is a graph showing the variations of the sizes of the opening of the main and auxiliary diaphragm apertures with time shown in FIGS. 1 to 3.
Figure 9:
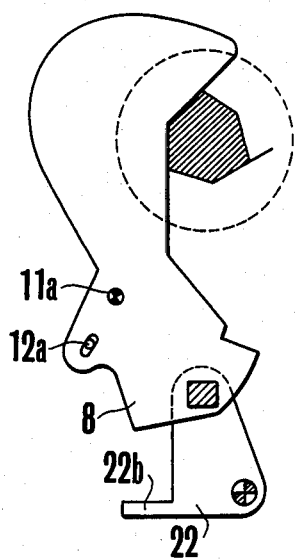
FIG. 9 is an elevational view showing the difference between the phases of variation of the main and auxiliary aperture openings of FIGS. 1 to 3 with the auxiliary aperture at the maximum size of opening.
Figure 10:
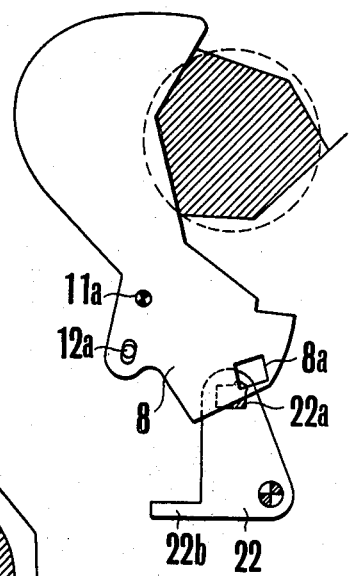
FIG. 10 is a similar view of the auxiliary aperture opening in the closed down position.

The foregoing operation is schematically graphically represented in FIG. 7. Though the force f of the return spring linearly increases as the shutter moves from the aperture closed to the fully open position, the drive force F from the electromagnetic drive source depends upon the positional relationship of the coil pattern to the magnets as has been mentioned above, increasing in the early stage of opening operation, then reaching a constant value in the intermediate stage, and then decreasing as the shutter gets nearer and nearer to the fully open position. In the open position, the force F is made slightly stronger than the force f and the shutter blades are held stationary. By the use of such dynamic features, the electromagnetically driven shutter of the present invention is protected from the influence of bouncing of the shutter blades as the drive force at the time of full opening of the shutter is minimized and the kinetic energy at the time of full opening is minimized.

Thus, at the start of movement of the shutter, there is exerted a driving force of such magnitude that the shutter can run at a sufficient speed against the bias force of the return spring. And, the driving force is increased at almost the same rate as that of the return springs to stabilize the running movement of the shutter. As the shutter blades go on, the magnitude of kinetic energy increases. After the electromagnetic force has reached the maximum level, an inertia takes place to cancel the further increased portion of the return spring force, and therefore the shutter continues to run. As the shutter blades near the fully open position, the equivalent stroke in such position becomes considerably large relative to the entire stroke. For example, if the maximum possible aperture is F/2.0, the stroke from F/2.8 to F/2.0 occupies ⅓ to ¼ times the total stroke. This means that the influence of the degree of stableness of the driving force is smaller when the shutter nears the fully open position than when in the early stage of opening movement. Therefore, even in the terminal stage of opening movement, the operation of the shutter is stabilized sufficiently and the shutter softly contacts the stopper 19 as the net driving force is rapidly decreased. In order to achieve such magnitude distribution of the driving force, the coil pattern on the shutter drive rotor is so arranged that the total length of that portion of the coil which interacts with the magnetic field gradually increases as the size of exposure aperture opening increases from zero, and gradually decreases as the size nears the maximum.

Since some bouncing of the shutter blade drive rotor 12 is unavoidable, another feature of the invention provides that the light metering diaphragm is made to close when the shutter drive rotor 12 bounces with the result that at this time a deactuating signal for the shutter is hardly produced. The adverse effect of the bouncing on the improvement of the accuracy of exposure control is minimized.

Figure 11:
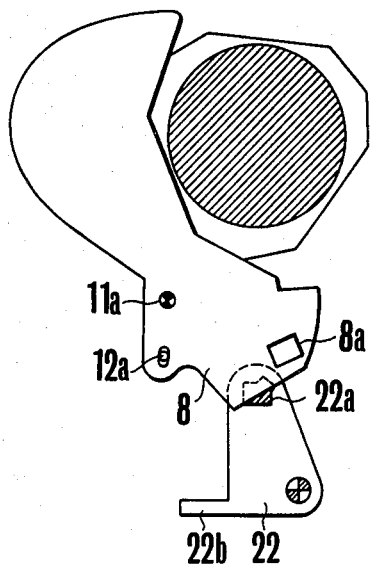
FIG. 11 is a similar view of the main and auxiliary apertures of FIGS. 1 to 3 in the full and half open positions respectively.

In this connection, additional explanation is given by reference to FIGS. 8 to 11. When the shutter blades 8, 9 and 10 are in the initial position, the auxiliary diaphragm is open only in a small area at the mask portion 22a of the auxiliary diaphragm blade 22 as shown in FIG. 2. Even this small area of the mask portion 22a is entirely closed in a time interval t1 in FIG. 8 with the original point at the start of current supply. Then, at a point in time t2, the auxiliary diaphragm starts to open as the right hand upper corner of the oblong window 8a in the shutter blade 8 comes to overlap the left hand lower corner 22a₁ of the mask portion 22a in the auxiliary diaphragm blade 22. Thus, light from the object being photographed enters the photo-sensitive element. While the auxiliary diaphragm is opening, the shutter starts to open at a time point t3 in FIG. 8, thus initiating an exposure of the photographic film 4. Then the size of the auxiliary diaphragm aperture opening reaches a maximum level at a time point t4 in FIG. 8, as the shutter blade 8 takes a position shown in FIG. 9. Even at this time t3, the shutter is still opening. Soon after that, the auxiliary diaphragm begins to close down, reaching a minimum level at a time point t5 in FIG. 8 with the position shown in FIG. 10. At this time, the photo-sensitive element 16 receives little light so that there is a very small possibility of occurrence of a deactuating signal for the shutter from a control circuit (not shown). Then, the auxiliary diaphragm again begins to increase its size of its aperture opening. Then, at a time point t6 the size of the exposure aperture opening reaches a maximum level while the size of the auxiliary diaphragm aperture opening is simultaneously taken at a value equal to ½ times the maximum. The terminal position is shown in FIG. 11. From this time onwards, the shutter blades 8, 9 and 10 operate in a similar manner to that described above.

With such an exposure error preventing device, it is possible for the shutter to start to close down after the disappearance of bouncing in a time interval from the attainment of the exposure aperture to the maximum during which the shutter would be otherwise deactuated. Because of this, the net exposure time is made somewhat longer than the correct one. But such overexposure can be negligible as compared with the length of the correct exposure as the exposure time which requires the full opening of the shutter may be considered to be relatively long. In general photographic situations the range of variation of the exposure level is not excessively widened by the provision of the device.

It is found that there is a time lag from the production of the shutter closing signal to the actual start of closing of the shutter. The excess of the exposure time due to this time lag must be compensated for. This is achieved by shifting the start of opening of the shutter behind the start of opening of the auxiliary diaphragm. The degree to which this time lag prolongs the exposure time differs between before and after the full opening of the shutter. That is, since the diaphragm built-in shutter is of the semi-open type, the shutter aperture until the full opening takes a triangular form, and after the full opening it takes a trapezoid form. Therefore, the rate of occurrence of an excessive exposure due to the time lag differs between when the shutter is opening to the maximum position and after the full opening is reached. On this account, according to the present invention, the variation of this rate is corrected by the opening state of the auxiliary diaphragm in such a manner that after the auxiliary diaphragm has been closed down to the minimum, it is set not to the full opening but to a half open position.

Another feature of the present invention is to finely adjust the time of the start of opening of the auxiliary diaphragm which in turn will adjust the opening characteristics of the shutter. This will be explained by reference to FIG. 1. Now assuming that the electromagnetic force F is too large to effect an overexposure when the derived exposure value requires a small size of exposure aperture opening, then the adjusting portion 22b is moved to shift the time point t2 to an earlier time point t2' when the auxiliary diaphragm blade 22 is turned in a counterclockwise direction. In this case, the opening characteristics are changed as indicated by a dashed line on the left side of the dashed line for the time point t2 in FIG. 8. This means that the circuit (not shown) gives off the deactuating signal at an earlier time so that the excess of the exposure time for the small size of shutter opening can be compensated for.

Conversely when the electromagnetic force is too small to effect an underexposure when the derived exposure value requires a small size of shutter opening, the auxiliary diaphragm blade 22 is turned in a clockwise direction by the adjusting portion 22b so that the time point t2 is delayed to a time point t2''. In this case, the auxiliary diaphragm opening characteristics are changed as indicated by a dashed line on the right side in FIG. 8, so that the exposure time is elongated to compensate for the shortage of exposure time in a range of small sizes of shutter opening. In this connection it is desired to align the axis of rotation of the auxiliary diaphragm built-in shutter blade 8, the axis of rotation of the auxiliary diaphragm blade 22 and the left hand lower corner $22a_1$ of the mask portion 22a on a common straight line, or otherwise deterioration of the shape of the auxiliary diaphragm aperture opening by the adjustment of the angular position of the auxiliary diaphragm blade will be intensified. In other words, a minimum amount of movement of the mask results in a maximum range of variation of the exposure time.

For this purpose, the adjusting portion 22b is preferably elongated to a sufficient extent, thereby giving the additional advantage that when carrying out the adjustment, magnetic foreign particles are prevented from entering the permanent magnet chamber by attraction.

It is also noted in connection with the auxiliary diaphragm opening characteristics that the speed of movement of the shutter blades is slow in the early stage of opening of the auxiliary diaphragm. Therefore, a very small difference in the adjusted position is largely scaled up as far as the earlier stage of opening operation is concerned. Such adjustment of the time of the start of opening does not later influence the accuracy of exposure control because the speed of movement of the shutter gets faster and faster as it approaches the fully open position and therefore the amount of movement by the position adjustment is negligible as compared with the time interval during which the fully open position is reached.

Again, the opening characteristics of the shutter can be otherwise altered by adjusting the overlapping of the shutter blades. This will next be explained by reference to FIG. 8.

In the above-described operation, when the electromagnetic force is set to be too large, the shutter starts to open at a time point t3'. In this case, the operator needs to turn the stopper 19 with a lowering of the upper tangent thereof which causes the amount of overlapped areas of the shutter blades 8, 9 and 10 to increase and therefore causes the time point t3' to be shifted to the time point t3. It is of great importance to provide the capability of such readjustment, because however small the difference in the overlapped areas of the shutter blades in the standstill position, the net exposure time is varied to a large extent when the resultant size of shutter opening is small, for the movement of the shutter blades is accelerated in the early stage. But such preliminary counter-measure does not have a large effect on longer shutter times as the speed of movement of the shutter blades is increased to the stabilized fast level in the terminal stage. Another aspect of the importance is that since the semi-open type shutter changes its size of opening in a great number of stops of smaller aperture value by a very short stroke when in the earlier stage of movement, the variation with time of the size of shutter opening is required to be sufficiently highly accurate. As the shutter nears the fully open position, the stroke for one stop becomes extremely long. Therefore, a modification of the variation with time of the size of shutter opening has little effect on the accuracy of automatic exposure control.

Such change of the shutter opening characteristics also causes large change of the auxiliary diaphragm opening characteristics which is later compensated for by readjusting the position of the mask portion 22a of the auxiliary diaphragm blade 22 by moving the adjusting portion 22b.

In a case where the electromagnetic force is found to be too small, the operator must turn the eccentric stopper pin 19 in a direction to decrease the overlapped areas of the shutter blades so that the time of the start of opening at a point t3'' is shifted to the point t3.

It is noted that in the present invention the rotor 12 is reinforced by a metal layer of the same kind as that of the metal of the coil 20 (in this case, copper foil) in the abutment-against-stopper portion, outer peripheral portion, inner peripheral portion and other portions requiring an increased strength, for example, spring bearing portions, indicated at 23a to 23f, as these portions of the metal layer are protected from etching. The provision of the outer peripheral metal or copper foil strip 23c has additional advantages that when the rotor 12 is punched out by pressing means, the cutting may operate at the same level as that of the coil portion and that the microcracks which would be otherwise developed into the coil portion are stopped in the area under the copper foil reinforcement since the stress resulting from the pressing operation is difused by the copper foil of large ductility. Thus, the printed coil 20 is protected from disconnection by cracks and the yield of articles can be improved.

The rotor 12 is struck against the stopper 19 with the production of a shock which is imparted to the rotor 12. Since the abutment-against-stopper portions 23a and 23b of the rotor 12 are reinforced by the metal layer, it is possible to prevent the production of cracks. Since the inner peripheral edge of the rotor 12 is reinforced by the metal layer 23c, it is possible to minimize the influence of thermal expansion on the rotative movement of the rotor 12 on the position determining member 12.

In the above embodiment, the coil 20 is described as configured to a number of sector patterns while the permanent magnet pieces as configured to rectangular pillars. But the present invention is not confined to this, and it is to be understood wherein the present invention includes a variation that a rectangular pattern may be imparted to the coil 20 with a sector shape being imparted to the permanent magnet.

As has been described above in greater detail, in the electromagnetically driven shutter of the present invention, the stationary magnetic field is formed by a permanent magnet of rectangular shape so that the coil pattern on the shutter drive rotor gradually enters the magnetic field one line element after one line element beginning from one end thereof nearest to the optical axis, and exits therefrom gradually beginning from the opposite end farthest from the optical axis, whereby upon cooperation with the bias force of the return spring, a smooth variation of the drive force can be obtained, and as the electromagnetic drive force is somewhat reduced in the later half of the range of movement where the motion is stabilized, it is possible to prevent the kinetic energy from becoming too large.

Further, according to the present invention, just before the diaphragm built-in shutter blades reach the fully open position, the auxiliary diaphragm is caused to close down to a certain level with the advantage that the influence of the bouncing of the shutter drive rotor on the exposure can be prevented. Further by the fine adjustment of the time of the start of opening of the auxiliary diaphragm and the standstill position of the shutter drive rotor, it is possible to readjust the shutter opening characteristics and to improve the accuracy of exposure control.

Further, according to the present invention, by leaving the metal of same kind as that of the metal of the coil on the necessary parts of the surfaces of the synthetic resin rotor it is possible to impart into the rotor a sufficient strength so that the shutter can withstand practical use. Such reinforcement of the rotor can be achieved automatically when the coil is fabricated on the rotor by etching techniques.

While specific embodiments of the invention have been shown and described in detail to illustrate the application of the inventive principles, it will be understood that the invention may be embodied otherwise without departing from such principles.

What is claimed is:

1. An electromagnetically driven shutter for a camera comprising:
   a magnetic member adapted to form a magnetic circuit;
   a permanent magnet for forming a magnetic circuit together with said magnetic member, said permanent magnet operating to produce a magnetic field;
   a positioning member composed of nonmagnetic material and including a frame with a portion engageable with said permanent magnet;
   a shutter driving rotor arranged in a space between said magnetic member and said positioning member, said space being formed by said frame of said positioning member;
   an inductive coil arranged on said rotor in a pattern in the form of a sector, said coil when supplied with current operating to generate an electromagnetic force to drive said rotor in order to open said shutter, with part of the effective line elements of said coil entering and exiting a peripheral portion of said magnetic field with an obliquely slanted orientation to control said electromagnetic force; and
   a spring exerting a force biasing said shutter to the closed position.

2. An electromagnetically driven shutter according to claim 1, wherein said shutter comprises shutter blades which also serve as diaphragm blades, and further includes an auxiliary diaphragm blade for light metering arranged to cooperate with said shutter blades in such a manner that just before said shutter blades reach the position of maximum opening, the size of the opening of said auxiliary diaphragm is stopped down.

3. An electromagnetically driven shutter according to claim 1, wherein said shutter comprises shutter blades which also serve as diaphragm blades; at least one of said shutter blades constituting part of an auxiliary diaphragm; said one shutter blade constituting part of said auxiliary diaphragm and the auxiliary diaphragm blade defining an auxiliary aperture opening; said shutter further comprising an adjustable member which adjusts the timing of the start of opening of said auxiliary aperture to effect the start of opening of said auxiliary aperture prior to the start of opening of said shutter blades for a selected time, whereby the start of opening of the said auxiliary aperture is made prior to the start of opening of said shutter blades, and the timing of the start of opening of said auxiliary aperture is made adjustable by the adjusting member.

4. An electromagnetically driven shutter according to claim 1, wherein said shutter drive rotor is stopped in a standstill position while under the influence of a bias force of said spring, and wherein said standstill position of said shutter drive rotor is adjustable by an adjusting member.

5. An electromagnetically driven shutter according to claim 1, wherein said shutter drive rotor is made up of synthetic resin, and the edges of said shutter drive rotor are reinforced by metal of the same kind as that of the metal of said conductive coil pattern.

6. An electromagnetically driven shutter comprising:
   shutter blade means for opening and closing an aperture of said shutter;
   rotor means for driving said shutter blades means;
   stator means including permanent magnet means for producing a magnetic field for driving said rotor means, said magnetic field thus formed having a rectangular configuration;
   conductive coil means arranged in the form of a sector shape provided on said rotor means, said conductive coil means when supplied with electrical current operating to interact with said magnetic field to exert an electromagnetic force to actuate said rotor means thereby to drive said shutter blade means to effect opening of said shutter aperture;
   said conductive coil means being arranged on said rotor means in such a manner that each of the effective line elements thereof enters into and exits from peripheral portions of said magnetic field with an obliquely slanted orientation during the initial stages and during the terminal stages of motion of said rotor means in the performance of an opening operation of said shutter blades;
   said conductive coil means thereby operating to generate a driving force for said rotor means which increases to a maximum and subsequently decreases from the initiation of the opening motion of said shutter blades until the termination of said opening motion; and
   spring means applying a biasing force urging said shutter blade means toward the closed position thereof.

* * * * *